(12) United States Patent
Yang et al.

(10) Patent No.: US 8,649,289 B2
(45) Date of Patent: Feb. 11, 2014

(54) METHOD OF PROVIDING RADIO ACCESS TECHNOLOGY INFORMATION OF A DEVICE MANAGEMENT CLIENT

(75) Inventors: Ju-Ting Yang, Taoyuan County (TW); Yin-Yeh Tseng, Taoyuan County (TW)

(73) Assignee: HTC Corporation, Taoyuan, Taoyuan County (TW)

( * ) Notice: Subject to any disclaimer, the term of this patent is extended or adjusted under 35 U.S.C. 154(b) by 57 days.

(21) Appl. No.: 13/217,297

(22) Filed: Aug. 25, 2011

(65) Prior Publication Data

US 2012/0051286 A1 Mar. 1, 2012

Related U.S. Application Data

(60) Provisional application No. 61/376,689, filed on Aug. 25, 2010.

(51) Int. Cl.
*H04L 1/00* (2006.01)
(52) U.S. Cl.
USPC .......................................... 370/252; 370/328
(58) Field of Classification Search
None
See application file for complete search history.

(56) References Cited

U.S. PATENT DOCUMENTS

| | | | |
|---|---|---|---|
| 7,047,035 B2 | 5/2006 | Yang | |
| 7,466,719 B2 | 12/2008 | Xu | |
| 2003/0026211 A1* | 2/2003 | Xu et al. | 370/252 |
| 2005/0197156 A1 | 9/2005 | Fourquin | |
| 2006/0217113 A1* | 9/2006 | Rao et al. | 455/422.1 |

FOREIGN PATENT DOCUMENTS

| | | | |
|---|---|---|---|
| CN | 1422093 A | 6/2003 | |
| CN | 1425256 A | 6/2003 | |
| WO | 2008044877 A1 | 4/2008 | |
| WO | WO-2008044877 * | 4/2008 | ............... H04B 7/26 |
| WO | 2009021208 A1 | 2/2009 | |

OTHER PUBLICATIONS

OMA Device Management Standardized Objects Version 1.2 Apr. 2006 Open Mobile Alliance.*
European patent application No. 11006962.2, European Search Report mailing date: Dec. 27, 2011.
"SACMO Specification, Draft Version 1.0", Open Mobile Alliance, OMA-TS-SACMO-V1_0-20100727-D, Jul. 27, 2010, p. 1-27, XP55009835.
"OMA Device Management Standardized Objects, Candidate Version 1.3", Open Mobile Alliance, OMA-TS-DM_StdObj-V1_3-20100525-C, May 25, 2010, p. 1-31, XP55015071.
OMA, OMA-TS-DM_StdObj-V1_3-20081015-D OMA Device Management Standardized Objects, Oct. 15, 2008.
OMA, OMA-TS-DiagMon_Functions-V1_0-20100812-D DiagMon Functions Supplemental Specification, Aug. 12, 2010.
OMA, OMA-TS-DiagMonMO-V1_0-20100518-D Diagnostics and Monitoring Management Object, May 18, 2010.

* cited by examiner

*Primary Examiner* — Chirag Shah
*Assistant Examiner* — Rina Pancholi
(74) *Attorney, Agent, or Firm* — Winston Hsu; Scott Margo

(57) ABSTRACT

A method of providing radio access technology information of a client in a service system supporting open mobile alliance device management for the client is disclosed. The method comprises creating a node for recording a current radio access technology that the client uses for communicating with a core network of a wireless communication system in a management object tree corresponding to a workflow for the device management.

4 Claims, 4 Drawing Sheets

METHOD OF PROVIDING RADIO ACCESS TECHNOLOGY INFORMATION OF A DEVICE MANAGEMENT CLIENT

CROSS REFERENCE TO RELATED APPLICATIONS

This application claims the benefit of U.S. Provisional Application No. 61/376,689, filed on Aug. 25, 2010 and entitled "Providing Current Radio Access Technology of Device in DM", the contents of which are incorporated herein in their entirety.

BACKGROUND OF THE INVENTION

1. Field of the Invention

The present invention relates to a method used in a service system, and more particularly, to a method of providing radio access technology information of a device in the service system.

2. Description of the Prior Art

The Open Mobile Alliance (OMA) is founded to develop OMA specifications for mobile services to meet users' needs. Furthermore, the OMA specifications aim to provide the mobile services which are interoperable across geographic areas (e.g. countries), operators, service providers, networks, operation systems and mobile devices. In detail, the mobile services conforming to the OMA specifications can be used by the users without restriction to particular operators and service providers. The mobile services conforming to the OMA specifications are also bearer agnostic, i.e., the bearer that carries the mobile services can be a second generation (2G) mobile system such as GSM, EDGE or GPRS, or a third generation (3G) and beyond mobile system such as UMTS, LTE or LTE-Advanced. Further, the mobile services can be executed on an operation system such as Windows, Android or Linux operated on various mobile devices. Therefore, industries providing devices or the mobile services supporting the OMA specifications can benefit from a largely growing market enabled by interoperability of the mobile services. Besides, the users use the devices or the mobile services supporting the OMA specifications can also have a better experience due to the interoperability of the mobile services.

In OMA Device Management (DM) requirement, a Management Authority (MA) is defined as an authorized legal entity which can manage one or more DM clients (e.g. mobile devices) by using a DM protocol conforming to the OMA specifications. Furthermore, according to deployment of a system supporting the OMA, the MA may directly manage the DM client, or the MA may manage the DM client via one or multiple DM servers, i.e., the DM client is actually managed by the one or the multiple DM servers. In detail, the DM protocol defines a way according to which a packet or a message is exchanged between the DM server and the DM client. The DM protocol also defines a way according to which the DM client can feedback a command, a status or a report to the DM server. Further, when using the DM protocol, the DM server manages the DM client through a set of management objects in the DM client. Management objects are logical collections of related nodes that enable the targeting of management operations. Each node in a management object may be small as an integer or large and complex like a background picture or screen saver.

Management objects defined in the DM specification include DevInfo management object and DevDetail management object. In DevInfo management object, device information for the DM server is recorded. In DevDetail management object, general device information that benefits from standardization is recorded. The difference between DevInfo and DevDetail is that the DevInfo parameters are needed by the management server for problem free operation of the OMA DM protocol. The DevInfo object is sent from client to server in the beginning of every session. Besides, Diagnostics and Monitoring (DiagMon) management object is defined to manage distributed, mobile wireless devices, in order to optimize a subscriber's experience and reduce network operating costs. There are functions defined in DiagMon related to RF metrics (i.e. 2G/3G measurement). DM server invokes these functions to ask DM client to measure and record the current RF information (e.g. Radio Access Technology (RAT) used by the DM client).

However, in OMA DM specification, there is no clear method defined for providing a current RAT of DM client, which conceptually sits between the mobile device and the core network (CN) of a wireless communication system to complete the wireless telecommunication, such as GSM, WCDMA, LTE, and non 3GPP radio access technologies. Therefore, the DM server may starting the wrong RF metrics function defined in DiagMon or retrieve wrong or out-of-date data of RF metrics since a RAT currently used by the DM client for communicating with the core network of the wireless communication system is not provided. More specifically, since the DM server does not know the current RAT of the DM client, the DM server may configure improper measurement configuration to the DM client, and thereby receiving wrong or out-of-date data of RF metrics.

Please refer to FIG. 1, which is a schematic diagram of a DevDetail management object tree. Note that, even though a node "CBT" (current bearer type) is defined in DevDetail management object tree in FIG. 1, it is still insufficient and ambiguous to know which RAT is used for communicating with the core network since "CBT" only provides bearer type information over which the DM session is currently being carried. For example, a DM client camped on UMTS network may use Wi-Fi to establish DM session with a DM server at very beginning, and the node "CBT" records a value indicating Wi-Fi. However, when the DM server uses the RF metric function, the DM server probably starts the wrong RF metrics function or retrieves wrong or out-of-date data of RF metrics, since the RAT currently used for communicating with the core network (which is UMTS in this example) is not provided.

Moreover, with only one value "3GPP packet Switched Bearer" corresponding to 3GPP packet Bearer defined in CBT, DM server cannot distinguish UMTS and GSM access technology. In a word, the DM server has no idea which RAT of DM client is applied, and thereby the DM server starting the RF metrics function defined in DiagMon may retrieve wrong or out-of-date data of RF metrics.

SUMMARY OF THE INVENTION

The disclosure therefore provides a method for providing radio access technology (RAT) information of a DM client, to solve the abovementioned problems.

A method of providing radio access technology information of a client in a service system supporting open mobile alliance device management for the client is disclosed. The method comprises creating a node for recording a current radio access technology that the client uses for communicating with a core network of a wireless communication system in a management object tree corresponding to a workflow for the device management.

A method of providing radio access technology information of a client in a service system supporting open mobile alliance device management for the client is disclosed. The method comprises using a first value for indicating that a currently used RAT is packet-switched type GSM and a second value for indicating that the currently used RAT is packet-switched type UMTS, wherein the first value and the second value are the values of a current bearer type node, which indicates the RAT the client currently uses to establish a DM session.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
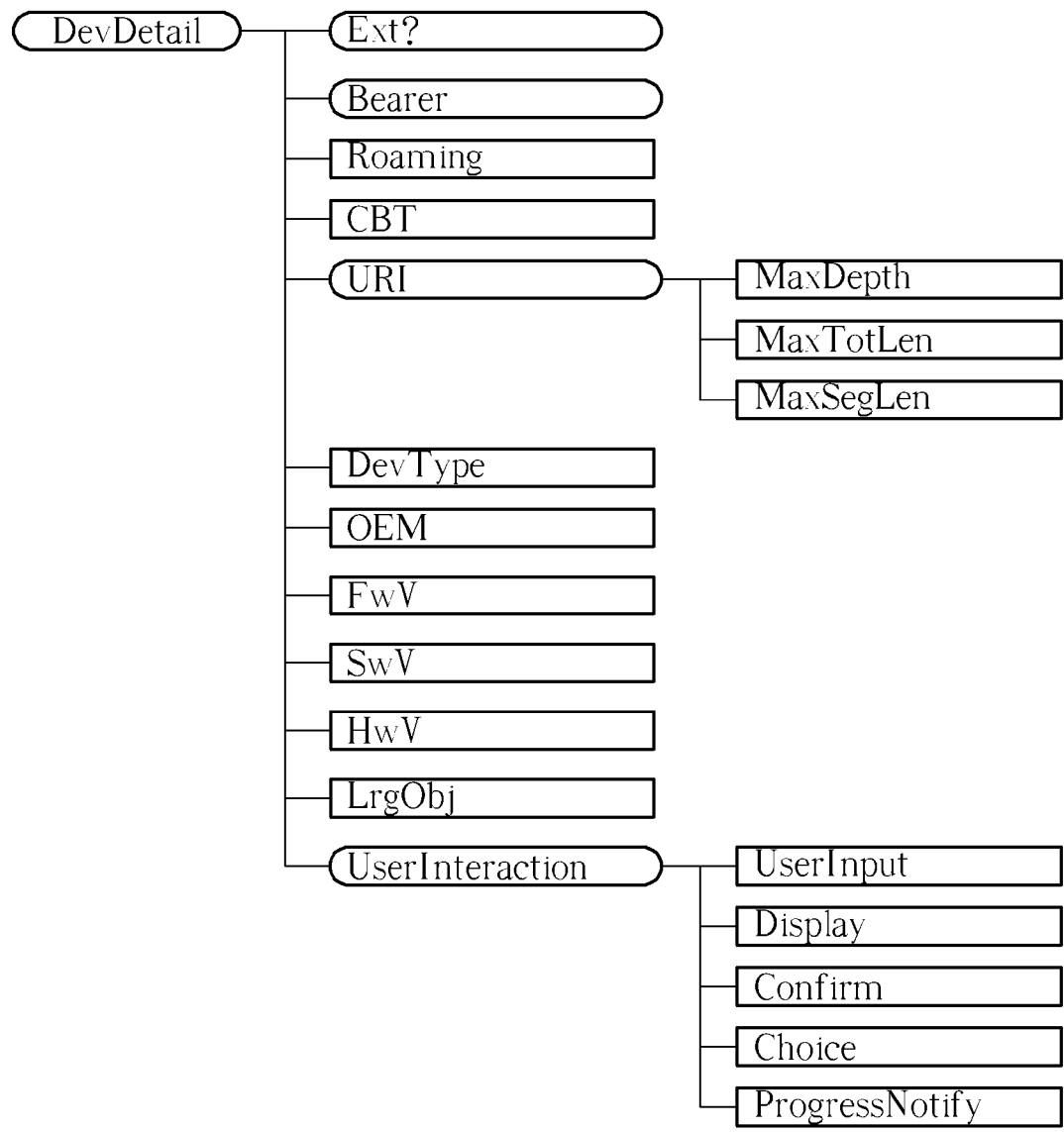
FIG. 1 is a schematic diagram of a DevDetail management object tree.
Figure 2:
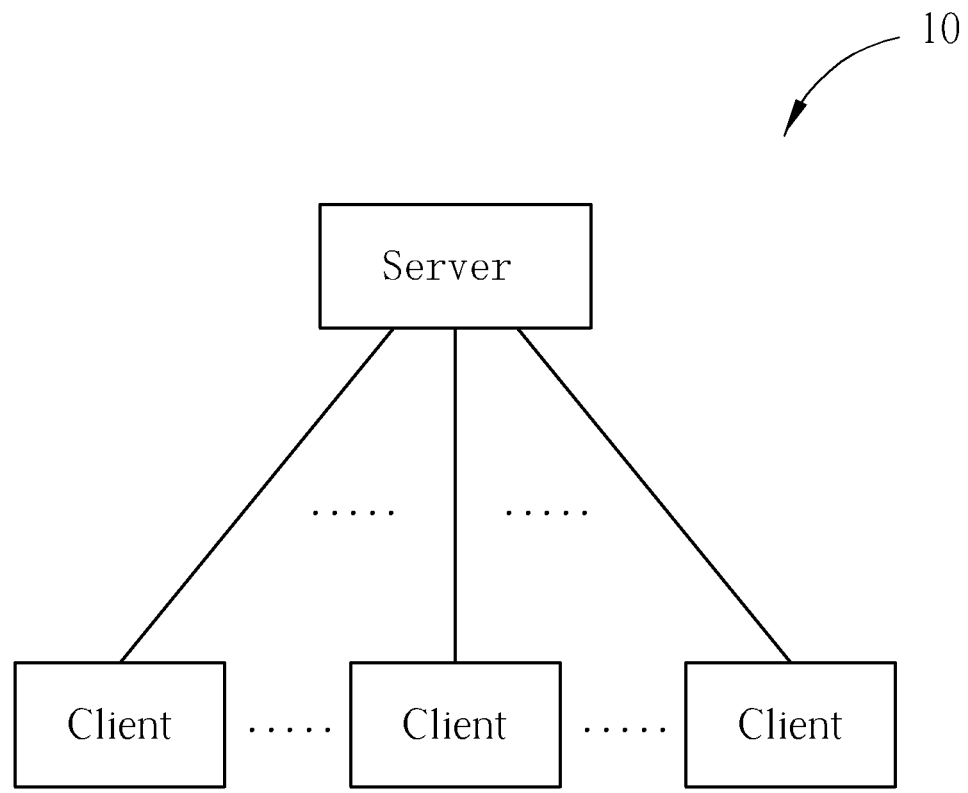
FIG. 2 is a schematic diagram of an exemplary service system according to the present disclosure.

Please refer to FIG. 2, which is a schematic diagram of a service system 10 according to an example of the present disclosure. The service system 10 supports an Open Mobile Alliance (OMA) Device Management (DM) protocol and is briefly composed of a DM server and a plurality of DM clients (hereafter clients for short). Further, there is a number of management objects defined in the DM specification. For example, a DevInfo management object, which is sent from a client to the server in the beginning of every session, and a DevDetail management object, which is requested by the server for transmission. Note that, the DM clients as mobile devices are also capable of performing wireless communication with a core network of a wireless communication system (which is not shown in FIG. 2), by using one or more than one radio access technology (RAT), e.g. GSM, GPRS, UMTS, LTE/LTE-A, WiMAX, etc. If the DM client supports more than one RAT, the DM client is capable of changing from the currently used RAT to another RAT, e.g. changing from GSM to UMTS or from LTE to UMTS.

Figure 3:
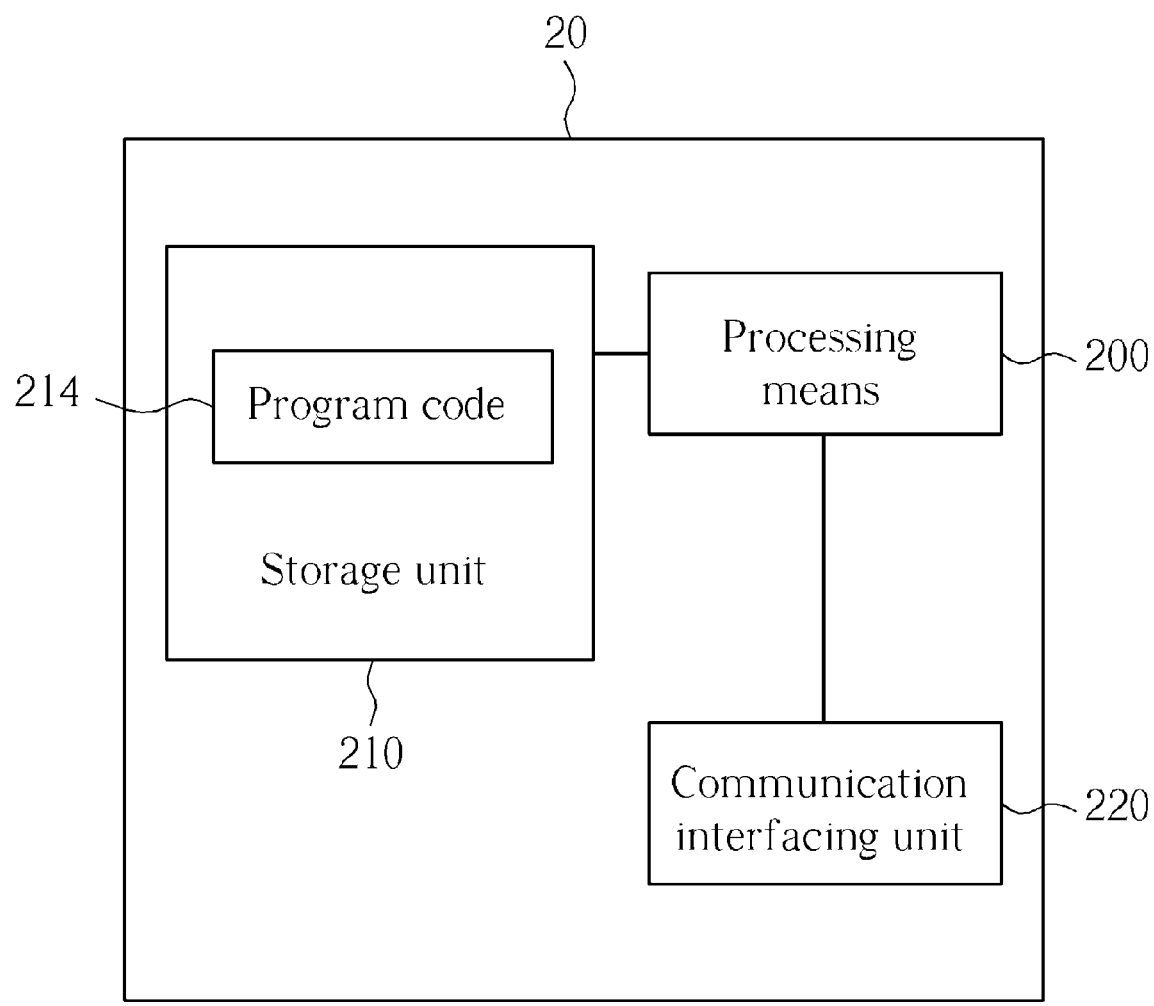
FIG. 3 is a schematic diagram of an exemplary communication device according to the present disclosure.

Please refer to FIG. 3, which is a schematic diagram of a communication device 20 according to an example of the present disclosure. The communication device 20 can be the client or the server shown in FIG. 2, but is not limited herein. The communication device 20 may include a processing means 200 such as a microprocessor or Application Specific Integrated Circuit (ASIC), a storage unit 210 and a communication interfacing unit 220. The storage unit 210 may be any data storage device that can store a program code 214, accessed by the processing means 200. Examples of the storage unit 210 include but are not limited to a subscriber identity module (SIM), read-only memory (ROM), flash memory, random-access memory (RAM), CD-ROM/DVD-ROM, magnetic tape, hard disk, and optical data storage device. The communication interfacing unit 220 is preferably a transceiver and can exchange signals with the server according to processing results of the processing means 200.

Figure 4:
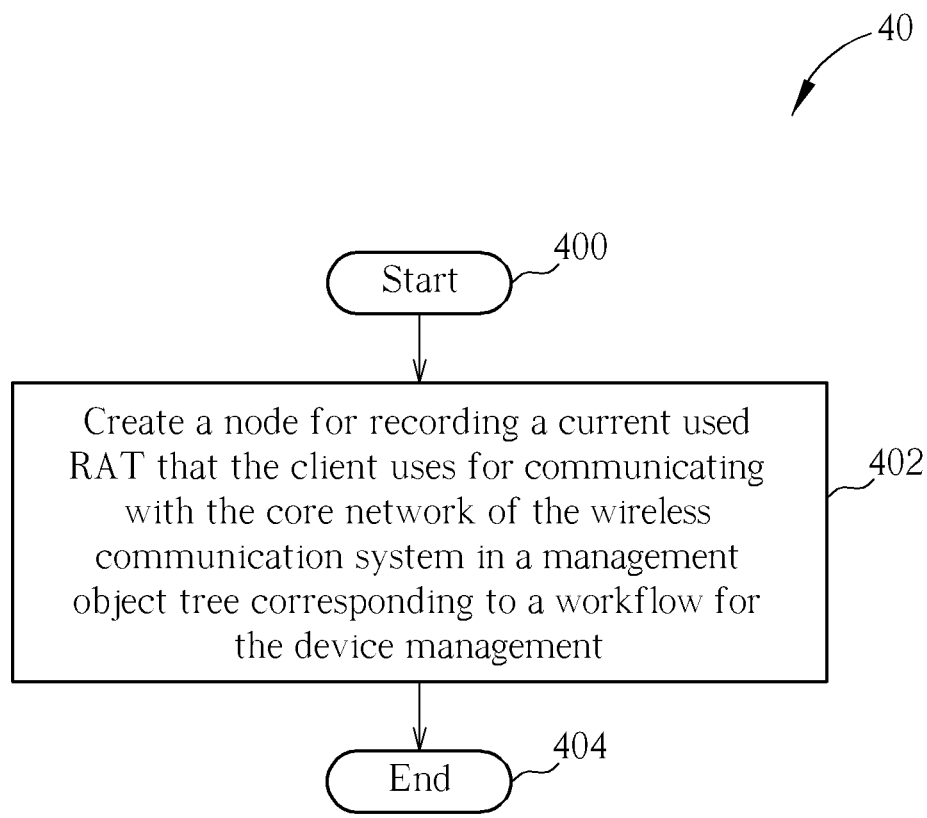
FIG. 4 is a flowchart of an exemplary process according to the present disclosure.

Please refer to FIG. 4, which is a flowchart of a process 40 according to an example of the present disclosure. The process 40 is utilized in a client for providing radio access technology (RAT) information of the client, which is used for communicating with a core network of a wireless communication system (not shown in FIG. 2), to the server shown in FIG. 2, so that the server can correctly perform function in DiagMon. The process 40 may be compiled into the program code 214 and includes the following steps:

Step 400: Start.

Step 402: Create a node for recording a current used RAT that the client uses for communicating with the core network of the wireless communication system in a management object tree corresponding to a workflow for the device management.

Step 404: End.

According to the process 40, a node is created in client management object tree to record a current RAT (e.g. GSM, GPRS, UMTS, LTE/LTE-A, WiMAX, etc) that the client uses to communicate with the core network of the wireless communication system. Moreover, the client maintains the data of the node by itself, which means that the data of the node is updated by client when the current RAT is changed.

Please note that, the node may be created by the client itself or by request from the DM server. Thus, the DM server knows the current RAT of the client according to the node in the management object tree, so as to arrange a proper configuration (e.g. measurement configuration for RF metrics)/resource to the client.

In detail, the node is created in DevInfo management object tree to record the current RAT of the client that is used for communicating with the core network. Server can know the current RAT of the client when the DM session is established since the DevInfo object is sent from client to server in the beginning of every session. Or, the node is created in DevDetail management object tree to record the current RAT of the client. Server retrieves the data of this node to know the current RAT of the client when this information is needed (namely, RAT information is requested by the server).

Besides, in DevDetail management object tree, one or more specific values of bearer type is added into a node "Current bearer type" (CBT) to distinguish a current bearer type the client currently uses (for establishing a DM session) more precisely. For example, a first value is included in the CBT for indicating "3GPP packet Switched Bearer-GSM", and a second value is included in the CBT for indicating "3GPP packet Switched Bearer-UMTS". With the new values of bearer type, server can distinguish UMTS and GSM access technology when retrieving the data in CBT node. Compared to the prior art, the server only knows that the DM session is established via "3GPP packet Switched Bearer", and can not distinguish different packet-switch type radio access technology, resulting in retrieving wrong or out-of-date data of RF metrics.

The abovementioned steps of the processes including suggested steps can be realized by means that could be a hardware, a firmware known as a combination of a hardware device and computer instructions and data that reside as read-only software on the hardware device or an electronic system. Examples of hardware can include analog, digital and mixed circuits known as microcircuit, microchip, or silicon chip. Examples of the electronic system can include a system on chip (SOC), system in package (SiP), a computer on module (COM) and the communication device 20.

In conclusion, a method of providing RAT information of a DM client is disclosed, so that the server can allocate a proper configuration/resource to the client, avoiding retrieving wrong or out-of-date data of RF metrics.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of providing radio access technology (RAT) information of a client in a service system supporting open mobile alliance (OMA) device management (DM) for the client, the method comprising:

creating, by a processing means of the client, a first node for recording a radio access technology (RAT) that the client uses for communicating with a core network of a wireless communication system in a management object tree corresponding to a workflow for the device management;

using, by the processing means of the client, a second node for recording current bearer type information which the client currently uses to establish a DM session with a DM server in the service system; and performing, by the DM server, measurement configuration to the client according to the RAT indicated in the first node, so that the DM server is able to know the RAT of the client according to the first node and prevents from improper measurement configuration which is configured according to the second node to the client, wherein a first value is used for indicating that the client currently uses packet-switched type GSM to establish the DM session, and a second value is used for indicating that the client currently uses packet-switched type UMTS to establish the DM session, wherein the second node for recording current bearer type information comprises the first value or the second value.

2. The method of claim 1, further comprising:
updating, by the processing means of the client, data of the first node when the RAT is changed.

3. The method of claim 1, wherein creating the first node for recording the RAT in the management object tree corresponding to the workflow for the device management comprises:

creating, by the processing means of the client, the first node when the DM server in the service system requests.

4. The method of claim 1, wherein the management object tree is a DevInfo management object tree or a DevDetail management object tree.

* * * * *